United States Patent
Pinto et al.

(10) Patent No.: US 12,353,790 B1
(45) Date of Patent: Jul. 8, 2025

(54) METHOD AND SYSTEM FOR TIME-ALIGNED AUDIO PLAYBACK

(71) Applicant: Apple Inc., Cupertino, CA (US)

(72) Inventors: Stephen E. Pinto, Mountain View, CA (US); Yasser Rihan, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 120 days.

(21) Appl. No.: 17/478,712

(22) Filed: Sep. 17, 2021

Related U.S. Application Data

(60) Provisional application No. 63/083,784, filed on Sep. 25, 2020.

(51) Int. Cl.

| | |
|---|---|
| *G06F 3/16* | (2006.01) |
| *G06F 3/01* | (2006.01) |
| *G06T 19/00* | (2011.01) |
| *H04J 3/06* | (2006.01) |
| *H04L 7/00* | (2006.01) |
| *H04R 3/12* | (2006.01) |

(52) U.S. Cl.
CPC .............. *G06F 3/165* (2013.01); *G06F 3/011* (2013.01); *G06T 19/006* (2013.01); *H04J 3/0667* (2013.01); *H04L 7/0008* (2013.01); *H04R 3/12* (2013.01)

(58) Field of Classification Search
CPC ........ G06F 3/165; G06F 3/011; G06T 19/006; H04J 3/0667; H04L 7/0008; H04R 3/12
See application file for complete search history.

(56) References Cited

U.S. PATENT DOCUMENTS

| | | |
|---|---|---|
| 7,765,315 B2 | 7/2010 | Batson et al. |
| 8,694,670 B2 | 4/2014 | Batson et al. |
| 8,762,580 B2 | 6/2014 | Rajapakse |
| 9,300,713 B2 | 3/2016 | Wang et al. |

(Continued)

FOREIGN PATENT DOCUMENTS

| | | | | |
|---|---|---|---|---|
| EP | 1758308 A1 | * | 2/2007 | ............... G01S 11/14 |
| WO | WO2016207428 | * | 12/2016 | ............ H04W 56/15 |

OTHER PUBLICATIONS https://developer.apple.com/videos/play/wwdc2019/603/—Introducing Realitykit and Reality Composer, 2019.

(Continued)

*Primary Examiner* — Patrick N Edouard
*Assistant Examiner* — Eboni N Giles
(74) *Attorney, Agent, or Firm* — Aikin & Gallant, LLP

(57) ABSTRACT

A method performed by a first device that has an internal clock. The method transmits a signal to a second device to share a clock of the first device. The method presents an extended reality (XR) environment and plays back audio content on the first electronic device, wherein the XR environment is also presented and the audio content is played back on the second electronic device The method generates timebase information that includes a first timebase that that defines a relationship between the shared clock and internal clock and a second timebase that defines a relationship between the first timebase and a playback state of the audio content. The method transmits the timebase information to the second device that synchronizes the playback state of the audio content in the second device, with the playback state of the audio content in the first device.

20 Claims, 6 Drawing Sheets

(56) References Cited

U.S. PATENT DOCUMENTS

| | | | |
|---|---|---|---|
| 9,979,998 | B1 | 5/2018 | Pogue et al. |
| 10,237,008 | B2 | 3/2019 | Butterworth et al. |
| 10,313,041 | B2 | 6/2019 | Butterworth et al. |
| 11,924,317 | B1 | 3/2024 | Pinto et al. |
| 2006/0280182 | A1 | 12/2006 | Williams et al. |
| 2008/0168470 | A1 | 7/2008 | Bushell et al. |
| 2008/0174662 | A1 | 7/2008 | Choi et al. |
| 2008/0304573 | A1* | 12/2008 | Moss ............... H04N 21/43072 375/240.28 |
| 2012/0219099 | A1* | 8/2012 | Loukianov ................ G06F 1/14 375/357 |
| 2013/0117597 | A1* | 5/2013 | Batson ............... H04N 21/4341 713/400 |
| 2015/0049248 | A1 | 2/2015 | Wang et al. |
| 2017/0180803 | A1* | 6/2017 | Lee ........................ H04H 60/74 |
| 2018/0196393 | A1 | 7/2018 | Oda et al. |
| 2018/0350374 | A1 | 12/2018 | Butterworth et al. |
| 2019/0324713 | A1 | 10/2019 | Millington |
| 2021/0104211 | A1* | 4/2021 | John ........................ G06F 3/017 |
| 2021/0243716 | A1* | 8/2021 | Ma ........................ H04W 4/029 |
| 2021/0405962 | A1 | 12/2021 | Mackay et al. |
| 2021/0409138 | A1 | 12/2021 | Galuten |
| 2022/0030214 | A1* | 1/2022 | Sinharoy .............. H04N 13/194 |
| 2023/0103012 | A1* | 3/2023 | Zinner .................. H04J 3/0697 370/503 |
| 2023/0214025 | A1* | 7/2023 | Lessman ................ G06F 3/011 345/156 |

OTHER PUBLICATIONS https://developer.apple.com/documentation/realitykit/synchronizationservice—Apple's Realitykit Synchroniztion Service, 2019.

* cited by examiner

METHOD AND SYSTEM FOR TIME-ALIGNED AUDIO PLAYBACK

This application claims the benefit pursuant to 35 U.S.C. 119(e) of U.S. Provisional Application No. 63/083,784, filed Sep. 25, 2020, which application is specifically incorporated herein, in its entirety, by reference.

FIELD

An aspect of the disclosure relates to aligning audio playback on several devices. Other aspects are also described.

BACKGROUND

In recent years, extended reality (XR) systems have become more ubiquitous in different industries, such as gaming and entertainment because of advancements in computer technology. Specifically, advancements in hardware and in software provide users with a more seamless and realistic experience within virtual worlds. In addition, with the proliferation of mobile devices (e.g., smartphones) and the creation of do-it-yourself stereoscopic viewers, users are no longer tied to a stand-alone XR system. Instead, users may simply attach the smartphone to the viewer and immediately engage in a virtual world.

SUMMARY

An aspect of the disclosure is a method performed by a first device of an audio system that aligns audio playback between one or more other devices. The audio system may include the first device (e.g., a head-worn device) that is participating in an extended reality (XR) environment with a second device. The first device may transmit a signal to the second device to share a clock (e.g., an internal clock). The first device presents the XR environment and plays back audio content, where the XR environment is also presented and the audio content is also played back on the second device (or one or more other devices). Specifically, users of both devices may be participants within the XR environment. For example, the playback of the audio content may be the result of user interaction of the first user of the first device (e.g., the first user ringing a virtual bell in the XR environment). The first device generates timebase information that is arranged to define timing relationships between playback states of audio content. Specifically, the generated information includes (e.g., as timing data) a first timebase that defines a relationship between the shared clock and the internal clock of the first device and a second timebase that defines a relationship between the first timebase and a playback state of the audio content. For instance, the playback state may be to initiate playback of the audio content and the second timebase may indicate that the audio content is to be played back at a playback time after a current time of the first timebase and at a particular playback rate. The first device may transmit the timebase information to the second device that synchronizes the playback state of the audio content in the second device with the playback state of the audio content in the first device (e.g., according to the relationships defined by the timebases).

In one aspect, the shared clock is based on a distance between both devices. Specifically, the first device determines whether the second device is located within a threshold distance of the first device, where, in response to the second device being located within the threshold distance, transmitting the signal to the second device to share the clock includes transmitting clock synchronization messages using IEEE 802.1AS protocol. If, however, both devices are far apart (e.g., the second device being located outside the threshold distance) the first device signals the second device to set a clock using time information obtained from a Network Time Protocol (NTP) server. Thus, both devices may share clocks via IEEE 802.1AS protocol or both devices may use timing information from a NTP server, based on their locations.

Another aspect of the disclosure is a method performed by the device (e.g., second device), which receives the generated timebase information in order to synchronize playback with the first device. Specifically, the device receives the signal from the first device to share the clock. The device receives a serialized description of the timebase information that includes the timebases. The device reconstructs the timebase information by deserializing the serialized description, and uses the reconstructed timebase information to playback the audio content in synchronization with the other device.

The above summary does not include an exhaustive list of all aspects of the disclosure. It is contemplated that the disclosure includes all systems and methods that can be practiced from all suitable combinations of the various aspects summarized above, as well as those disclosed in the Detailed Description below and particularly pointed out in the claims. Such combinations may have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Figure 1A:
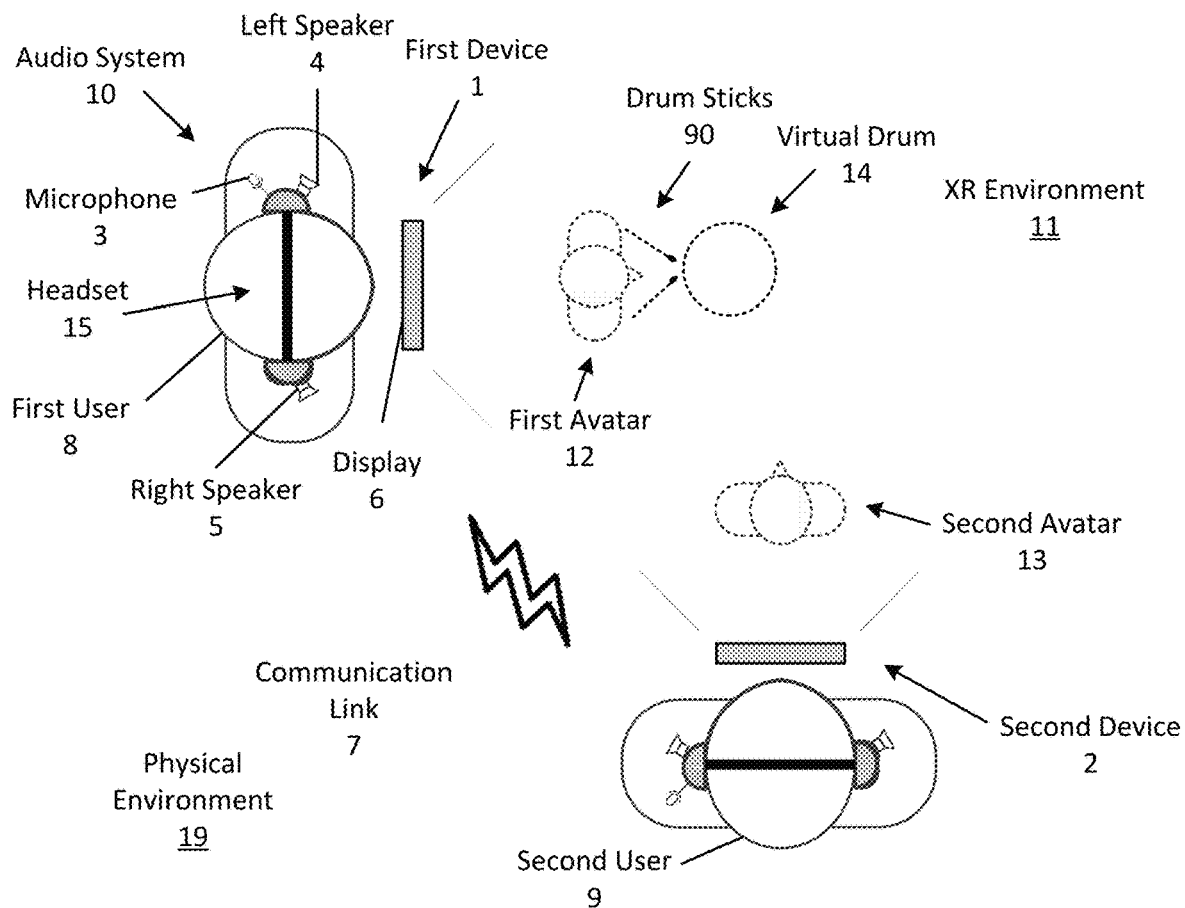
FIGS. 1A and 1B shows an audio system with first and second electronic devices that perform time-aligned audio playback operations according to one aspect.

Several aspects of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

A physical environment (or setting) refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, an extended reality (XR) environment (setting) refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a XR environment may be made in response to representations of physical motions (e.g., vocal commands).

A person may sense and/or interact with a XR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality. A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various XR environments. Examples include head mounted systems (or head mounted devices (HMDs)), projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

XR is used across many different industries to provide users with various simulated experiences. For instance, automotive engineers and designers use XR to build and experiment with various virtual vehicles without having to build a physical prototype. As another example, the entertainment industry provides users with interactive experiences within virtual worlds. These virtual experiences are not only visual, but also audible, having users hear sounds from (or as if emerging from within) the virtual environment. Sometimes multiple users may participate within the same virtual world and interact with one another, such as when (e.g., two) users participate, via separate electronic devices, in a virtual environment within a computer game. For instance, a virtual environment may be displayed on each electronic device's display and sounds from within the environment, such as ambient virtual sounds, sounds produced by virtual objects, such as a telephone ringing, etc., may be played back via each electronic device's speaker(s). Synchronized audio playback between electronic devices is essential in order to provide the best user experience. For example, if users were in the same physical room and sound playback of a virtual door closing is not synchronized between both devices, each user may hear cross-talk from the other's speakers. This cross-talk may diminish spatial perception of audio playback heard by each user, which may lead to a poor user-experience. Thus, it is important that audio playback between participants' devices is time-aligned so that playback is synchronized (e.g., such that virtual sounds are experienced by each user at the same time).

Conventional methods for time alignment for media playback between electronic devices involve a "best effort" approach. For example, when the user of one device closes the virtual door (e.g., based on user-input), the device transmits a message to another device containing data indicating that the door has been (or is being) closed and that the sound of a door closing is to be played back through the other device. Once the other device receives the message, the device immediately visually and audibly presents the door closing. This method, however, is subject to latencies (e.g., to a computer network of which both devices are communicatively coupled). As a result, although the other device may playback the sound immediately (e.g., once the message is received), the playback time of one device may be later (or before) playback time of the other. Thus, both devices may not playback the sound at the same time, resulting in cross talk as previously described. Therefore, there is a need for an audio system that provides time-aligned media (e.g., audio and/or video) playback.

Figure 1B:
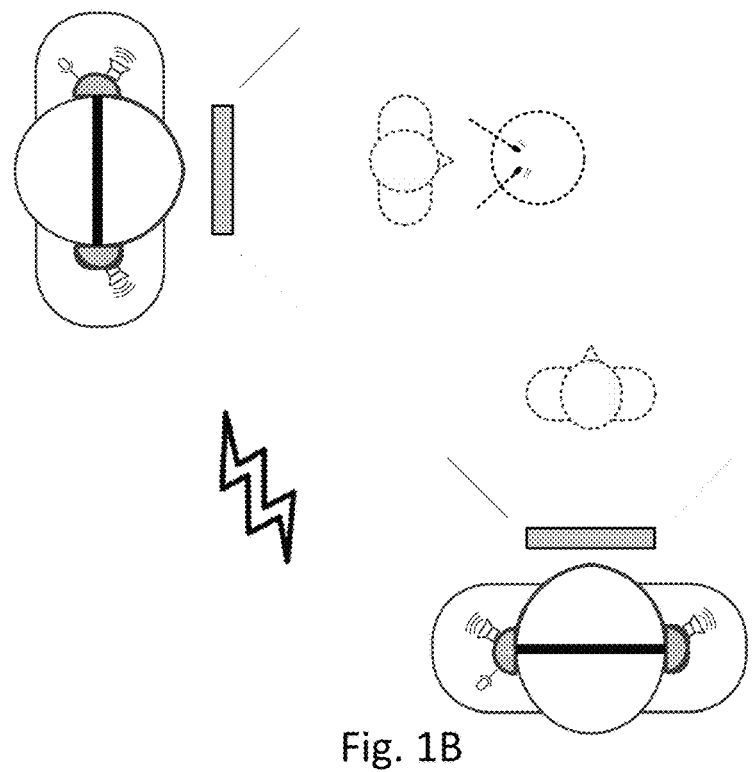

FIGS. 1A and 1B shows an audio system with first and second electronic devices that perform time-aligned audio playback operations according to one aspect. Specifically, each figure illustrates an audio system 10 that includes a first electronic (audio) device (or first device) 1 that is positioned in front of a first user 8 and a second electronic (audio) device (or second device) 2 that is positioned in front of a second user 9 within a physical environment 19. Each figure also illustrates a XR environment 11 in which both of the users are participating via their respective devices. More about the XR environment is described herein.

In this figure, both of the electronic devices 1 and 2 may each include one or more displays (display screens) 6 that are configured to display image data and/or video data (or signals) to each respective user that represents at least one scene within the XR environment 11. Specifically, each of the electronic devices may be a handheld device, such as a tablet computer, smart phone, etc. In this case, each user is holding their respective device in front of one or both of their eye's such that they may view the device's display screen. In one aspect, each device may be any portable electronic device, such as a smart phone, laptop computer, etc. In another aspect, the electronic devices may be arranged to be received by a head-worn device (HWD), such that when received the electronic devices may display a three-dimensional (3D) visual representation of the XR environment 11. In some aspects, at least one of the electronic devices may be a head-worn device, such as smart glasses.

Each user is also shown as wearing a headset 15, which is arranged to be worn on the head of the user. The headset includes a (or at least one) microphone 3, at least one left speaker 4, and at least one right speaker 5. The microphone 3 that may be any type of microphone (e.g., a differential pressure gradient micro-electro-mechanical system (MEMS) microphone) that is arranged to convert acoustical energy caused by sound waves propagating in an acoustic (e.g., physical) environment into a microphone signal. Each of the speakers is configured to playback audio (e.g., sounds of the XR environment 11). Each speaker may be an electrodynamic driver that may be specifically designed for sound output at certain frequency bands, such as a woofer, tweeter, or midrange driver, for example. In one aspect, at least one of the speakers may be a "full-range" (or "fullband") electrodynamic driver that reproduces as much of an audible frequency range as possible.

In one aspect, each of the speakers 4 and 5 of the first device are "extra-aural" speakers that are positioned on (or integrated into) a housing of the device and arranged to project (or output) sound directly into the physical environment 19. This is in contrast to "internal" speakers, which may be speakers that are arranged to project sound (e.g., directly) into or towards a user's ears. For example, an in-ear headphone (or earbud) may include an internal speaker, which when the in-ear headphone is inserted into a user's ear, the internal speaker projects sound into the user's ear canal. As shown, the headset 15 is an over-the-ear headset (or headphones) that at least partially covers both of the user's ears. The left speaker 4 and the microphone 3 are coupled to a left headset housing of the headset and the right speaker 5 is coupled to a right headset housing of the headset. In one aspect, the headset may include or be coupled to multiple extra-aural speakers that form a speaker array that is configured to produce spatially selective sound output. For example, the array may produce directional beam patterns of sound that are directed towards locations within the environment, such as towards the ears of the user. In another aspect, the headset may include any number of extra-aural speakers, which may be arranged in any configuration. For instance, rather than having two speakers, one on each housing, the headset may only include one extra-aural speaker coupled to one housing. In some aspects, in addition to (or in lieu of) the extra-aural speakers, the headset may include at least one internal speaker that is arranged to direct sound into (and towards) the ears of the wearer. For instance, the left headset housing may include at least one internal speaker, and the right headset housing may include at least one internal speaker. In some aspects, the device may include both or either types of speakers.

In some aspects, the headset 15 may include any type of audio output device arranged to output sound, such as an on-the-ear headset or an in-ear headset (earphone or earbuds). In another aspect, the headset 15 may be any electronic device with a display, such as a smart phone, a tablet computer, a laptop, a desktop, or the like.

In one aspect, the first (and/or second) electronic device 1 may be one electronic device, which includes at least some of the components described herein. As described herein, the headset 15 is separate from the first electronic device 1 In this case, both devices may be communicatively coupled to one another, via a wireless connection (e.g., BLUETOOTH connection), such that both devices may exchange (e.g., audio) data between one another. For example, when presenting the XR environment, the first device 1 may transmit audio data (one or more audio signals) associated with the environment to the headset 15 in order to output the audio data through the left and right speakers. More about exchanging audio data is described herein. In another aspect, both devices may be integrated with one another. For example, the first device 1 may include at least some of the components of the headset 15, such as the microphone 3, left speaker 4, and right speaker 5. In this case, the first user 1 may use the first device 1 to participate in the XR environment without the need of a headset. In another aspect, at least some of the components described herein may be a part of two or more separate devices (e.g., that are communicatively coupled with one another, such as through a BLUETOOTH connection). For instance, each of the speakers 4 and 5 may be (a part of) standalone speakers that are communicatively coupled to the first device 1.

As shown, the second device 2 is the same type of device as the first device 1. The second user 9 is also shown to be wearing the same type of headset (e.g., headset 15), as the first user 8. In another aspect, both electronic devices may be different. For example, the second device 2 may be a HWD in which the speakers, microphone, and display are integrated into (or a part of) a single electronic device. In another aspect, the second device may include more components as the first device (e.g., having two or more microphones, etc.).

Both the first device 1 and the second device 2 are communicatively coupled to one another via a communication data link 7. For instance, both devices may be configured to establish a wireless connection via any wireless communication protocol (e.g., BLUETOOTH protocol). During the established link, both devices may exchange (e.g., transmit and receive) data packets (e.g., Internet Protocol (IP) packets), which may include audio digital data and/or video data (e.g., associated with the XR environment). In another aspect, the communication link 7 may be established over a computer network (e.g., the Internet). In this case, both devices may be located in separate locations, but connected to the Internet via separate local area networks (LANs). In some aspects, the devices may be wireless devices that communicate over a wireless computer network (e.g., WLAN). In another aspect, the devices may communicate over any type of communications network, such as a cellular network.

Returning to FIG. 1A, this figure illustrates that the first user 8 and the second user 9 participating in a XR environment 11, through the use of their respective devices (and headsets). The XR environment includes a first avatar 12 that corresponds with the first user and a second avatar 13 that corresponds with the second user. Specifically, the devices 1 and 2 are both presenting the XR environment (via their displays) to each respective user through the perspective of their respective avatars (e.g., in a first-person perspective). In another aspect, either of the devices may present the XR environment in another perspective, such as a third-person perspective, as illustrated herein. In this figure, the first avatar is holding a pair of drum sticks 90 and is standing in front of a virtual drum 14. As shown, both headsets 15 are not, however, outputting any sound via their respective speakers (which may be the case when no sounds are occurring within the XR environment).

FIG. 1B illustrates that the first avatar 12 is playing the virtual drum 14 (e.g., based on user-input of the first user 8), and as a result both the first and second user's headsets are playing back the audio content (e.g., sounds of drums being played) in synchronization. Specifically, the first device 1 may include (and/or be communicatively coupled to) one or more user-input devices, each configured to allow the user to interact with the XR environment in response to user input. For example, the first device may receive user input via a user-input device (e.g., a controller) to interact with the virtual drum 14 within the XR environment. In this case, the user input may be an up and down hand motion, of which the user-input device tracks (e.g., using a motion sensor integrated therein). This motion data is then used by the first device 1 to perform a corresponding motion of the drum sticks 90 atop the virtual drum 14.

Once the first user 1 interacts with the XR environment 11 (e.g., by playing the virtual drum 14), the first device 1 is configured to transmit timing data to the second device 2, such that both devices playback the sound of playing drums simultaneously. Specifically, the first device is configured to perform time-aligned audio playback operations of the present disclosure. In particular, the first device is configured to signal (or transmit a signal to) the second device to share a clock. In one aspect, the first device may share an internal clock of the first device with the second device, such that both devices have separate internal clocks that are (at least partially) synchronized with one another. For example, the first device may transmit clock synchronization messages using IEEE 802.1AS protocol, thereby aligning both device's internal clocks. The first device generates a timebase hierarchical tree as timebase information (or timing data) that defines a relationship between the shared clock and one or more playback states of audio content that is to be played back within the XR environment (e.g., the sound of drums). In this case, the relationship may indicate that both devices are to playback the sound immediately, with respect to the shared clock. More about timebase hierarchical trees is described herein.

The first device transmits the timing data to the second device. Both devices playback the sound of the drums according to the same hierarchical tree (e.g., hierarchical trees that may include one or more timebases that have the same or similar relationships between clocks and/or timebases), such that the playback state of the drums is synchronized across both devices. In particular, both devices may transmit audio data to their respective headsets 15 to drive the headsets' one or more speakers. This synchronization is made possible since both devices have timebase hierarchical trees are rooted in a shared clock between the devices. As a result, both devices will playback time-aligned audio (e.g., of the XR environment), thereby reducing (or eliminating) cross-talk.

Figure 2:
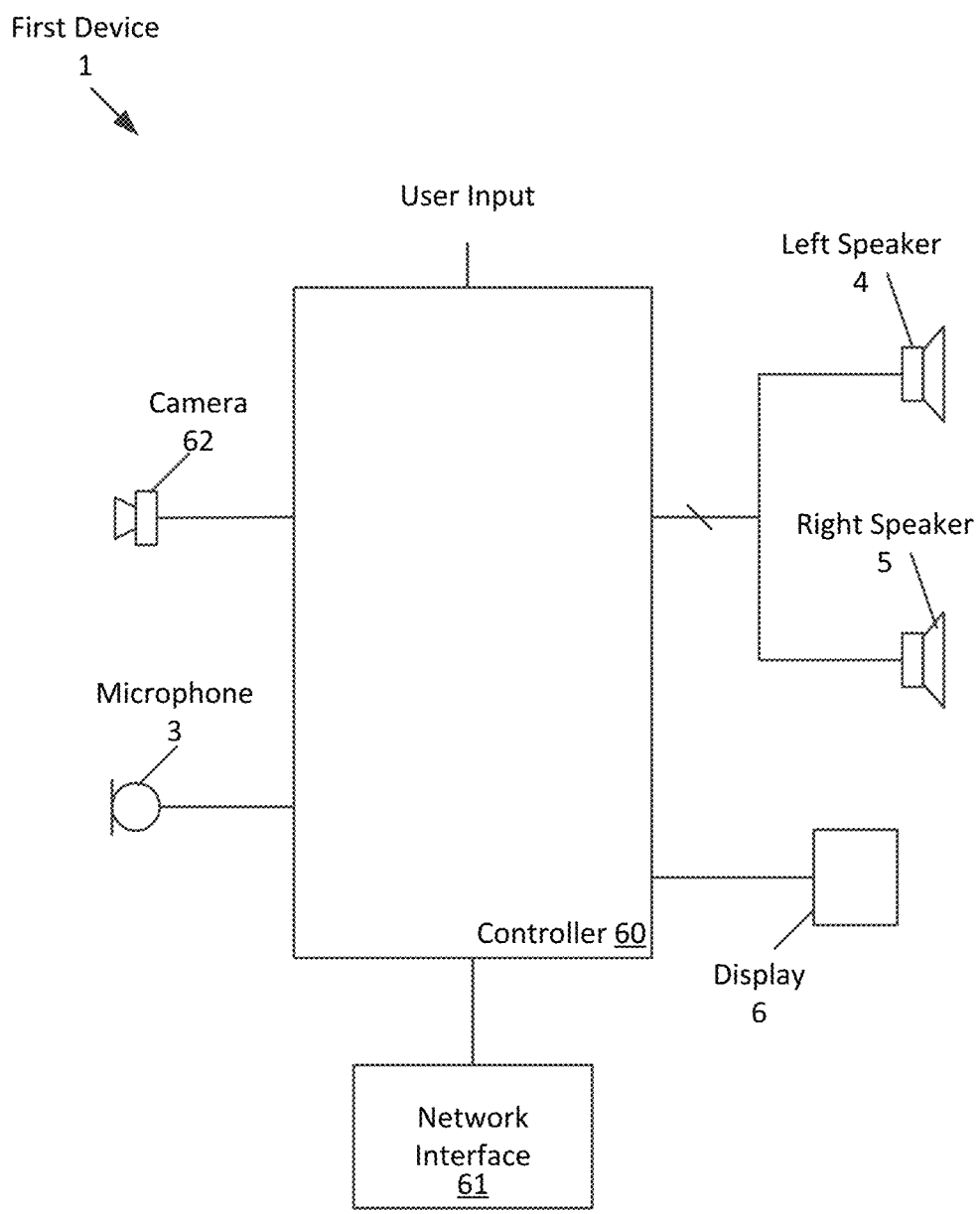
FIG. 2 shows a block diagram illustrating the first electronic device according to one aspect of the disclosure.

FIG. 2 shows a block diagram illustrating the first device according to one aspect of the disclosure. The device includes (or is coupled to) the microphone 3, the left speaker 4, the right speaker 5, the display 6, a controller 60, a network interface 61, and at least one camera 62. In one aspect, the first device may include more or less elements, such as having three or more speakers, one or more microphones, and one or more cameras. As described herein, each of these components may be a part of (integrated into) the first device. In one aspect, the second device 2 of FIGS. 1A and 1B may have at least some of the elements of which are included in the first device.

As described herein, the first device may be a wireless device. For example, the network interface 61 is configured to establish a wireless communication link (e.g., link 7 illustrated in FIGS. 1A and 1B) with another (wireless) device (such as the second device 2, a wireless access point, etc.) in order to exchange data over a wireless network. In another aspect, at least some of these components may be a part of a separate device, such as headset 15 shown in FIGS. 1A and 1B. In another aspect, the network interface 61 is configured to establish a wireless communication link with an audio output device, such as the headset 15. In that case, the headset may transmit sensor data, such as microphone signals captured by one or more microphone, and the first device may transmit audio data, such as audio driver signals to drive one or more speakers of the headset.

In one aspect, at least some of the elements of device 1 described herein (e.g., the camera 62) may be a part of a different electronic device within the audio system 10, or may be a standalone device that communicates with the (controller 60 of the) first device via a wired (or wireless) communication link, such as link 7.

In one aspect, the camera 62 is a complementary metal-oxide-semiconductor (CMOS) image sensor that is capable of capturing digital images as image data that represent a field of view of the camera, where the field of view includes a scene of an environment (e.g., the physical environment 190) in which the device is located. In some aspects, the camera may be a charged-coupled device (CCD) camera type. The camera is configured to capture still digital images and/or video that is represented by a series of digital images. In one aspect, the camera is an "external" camera that is arranged to capture scenes that expand away from the device (e.g., the camera may be positioned to have a field of view that extends in a front direction and away from the device).

The controller 60 may be a special-purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines). The controller is configured to perform one or more operations as described herein. For example, the controller may be configured to perform image and/or audio rendering operations for the XR environments to be presented by the device 1. For example, the controller may retrieve graphical data (e.g., three-dimensional (3D) models, etc.) from (e.g., local or remote memory storage) and 3D render the XR environment. In addition, the controller may render the XR environment in real-time based on user input, as described herein. For example, the controller may receive user input (e.g., from an user-input device communicatively coupled to the device). This input may adjust the user's perspective within the environment, which would therefore change what is displayed on the display 6. The controller uses this input to update the renderings of the XR environment. In addition, the controller is configured to perform audio signal processing operations to render audio data of the XR environment to produce one or more driver signals for driving the device's speakers. This rendering may be a spatial rendering in order to provide an immersive audio experience to the user of the device. In another aspect, at least some rendering may be performed by a remote device (e.g., a remote electronic server), with which the controller is communicatively coupled (via the network interface 61). In this case, the server may render the XR environment and transmit rendered data to the controller for presentation. In addition, the controller 60 may be configured to perform time-alignment operations, such that the first device 1 and one or more devices (e.g., second device 2) become configured to playback time-aligned audio content. More about these operations is described herein.

Figure 3:
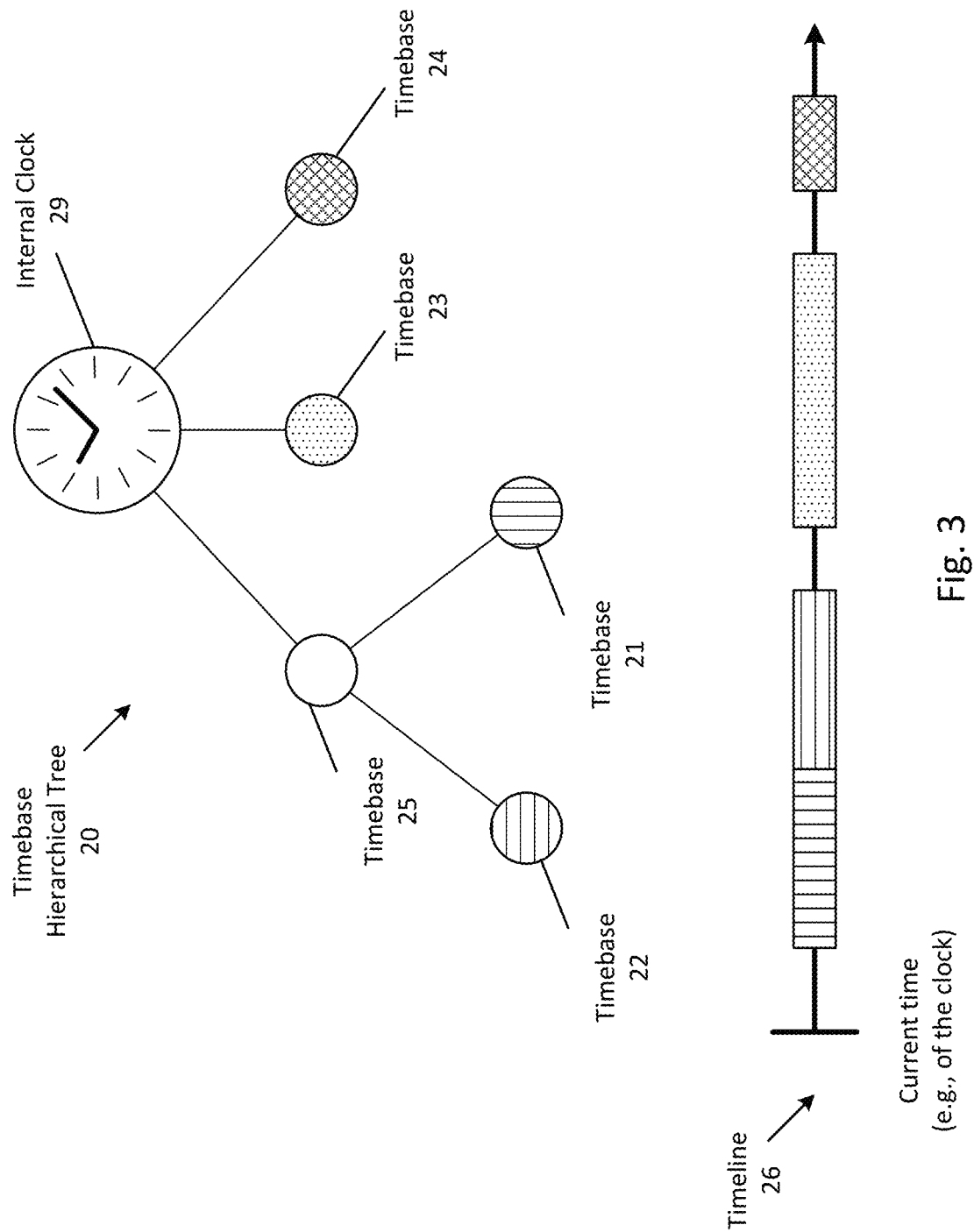
FIG. 3 shows a timebase hierarchical tree for audio playback by the first electronic device according to one aspect.

FIG. 3 shows a timebase hierarchical tree for audio playback by the first device according to one aspect. Specifically, this figure is illustrating a timebase hierarchical tree 20 that is a hierarchical description of time and events that are to occur at particular moments in time with respect to one another by the first device. As shown, the tree includes several timebases 21-25, each of which has (or defines) a relationship with either a clock (e.g., an internal clock 29) of the first device or another timebase from which it branches. For instance, timebases 23 and 24 define a relationship with the internal clock 29 (the root of the tree) and timebases 22 and 21 define a relationship with timebase 25, which defines a relationship with the clock 29. Thus, each timebase is a child that has a relationship to a parent, which may be another timebase or a clock. Each timebase may be represented as $$T_{child} = R*(T_{parent} - T_a) + T_b$$

where $T_{child}$ is a (current) time of the timebase, $T_{parent}$ is the (current) time of the parent clock or another timebase with which $T_{child}$ has a relationship, R is the rate at which the time of $T_{child}$ passes with respect to its parent, $T_a$ is an anchor time of the parent, and $T_b$ is an anchor time of the timebase. In one aspect, $T_a$ may be an offset of the time of the parent clock. In another aspect, $T_b$ may represent the child timebase's time that corresponds to the offset of the parent clock. For instance, $T_b$ may be set to the child's desired time, while $T_a$ may be set to the parent's current time, in order for $T_{child}$ to start at the desired $T_b$.

In one aspect, the (e.g., controller 60 of the) audio system may define audio playback of one or more pieces of audio content (e.g., associated with the XR environment) with respect to the tree 20. In particular, a timebase within the tree may describe playback (or a playback state) of a particular piece of audio content (e.g., an audio file) and may describe an affine relationship to either another timebase or a clock, as described herein. For example, timebase 22 may describe a timing of playback of a piece of audio content (e.g., the sound of drums as described in FIG. 1B). To ensure that the sound of the drums starts now (or immediately) and to playback at a normal speed (e.g., non-adjusted speed), timebase 22 may be defined as $$T_{(22)}=1.0*(T_{(25)}-T_{(25)\_current\_time})+0$$

where the R is set to 1.0 (e.g., not adjusted), $T_{(25)}$ is the time of the parent timebase 25, $T_{(25)\_current\_time}$ (or $T_a$) is set to the current time of timebase 25 (e.g., having no offset), and $T_b$ is set to 0, which indicates that the timebase 22 is to start without an offset (e.g., with respect to the parent's time).

If, however, a user may wish to playback the sound at half speed and to start five seconds from now, the timebase may be $$T_{(22)}=0.5*(T_{(25)}-(T_{(25)\_current\_time}+5)+0$$

In one aspect, timebases may be structured differently, while providing the same relationship between a child and a parent. For example, the same type of playback described above for a sound to play back at half speed and start five seconds from now may be described as $$T_{(22)}=0.5*(T_{(25)}-(T_{(25)\_current\_time})-2.5$$

As illustrated in this figure, timebases 21-24 each describe playback of a different piece of audio content, such as audio content that is to be played back within the XR environment 11 of FIG. 1B. For example, to present the XR environment, the controller 60 of the device 1 may receive audio and/or image (video) data of the environment as data files in any format, such as Universal Scene Description (USDz) format. These data files may include one or more audio assets and/or one or more animation (e.g., video, still images, etc.) assets. The device may generate a timebase tree in which each timebase of the tree is for an individual asset (e.g., video and/or audio) within the USDz file. In one aspect, the controller may generate a final timebase to serve as a shared parent for at least some of the other timebases. Thus, the timebase hierarchical tree may represent a full playback scene within an XR environment.

This figure also illustrates a timeline 26, which starts at a current time of the internal clock and moves forward with respect to the internal clock 29. Specifically, the timeline 26 (e.g., the black line) may correspond to (or be) the time of the internal clock 29. The timeline shows the playback time and duration of the pieces of audio content that are associated with timebases 21-24 (as illustrated by corresponding hatches) with respect to time (e.g., the time of the internal clock 29). Thus, as shown, a first piece of audio content associated with timebase 21 starts first, followed immediately by a second piece of audio content associated with timebase 22. A third piece of audio content associated with timebase 23 starts after (e.g., a period of time from when) the second piece of audio content ends, and a fourth piece of audio content associated with timebase 24 starts after that. In some aspects, one or more timebases may not be associated with any particular piece of audio content, such as timebase 25 (as indicated by not having any hatching fill). Instead, the timebase 25 may be associated with video playback. In another aspect, the timebase 25 may not be associated with any asset (audio or video), but instead be a timebase that represents a relationship with the clock 29.

Figure 4:
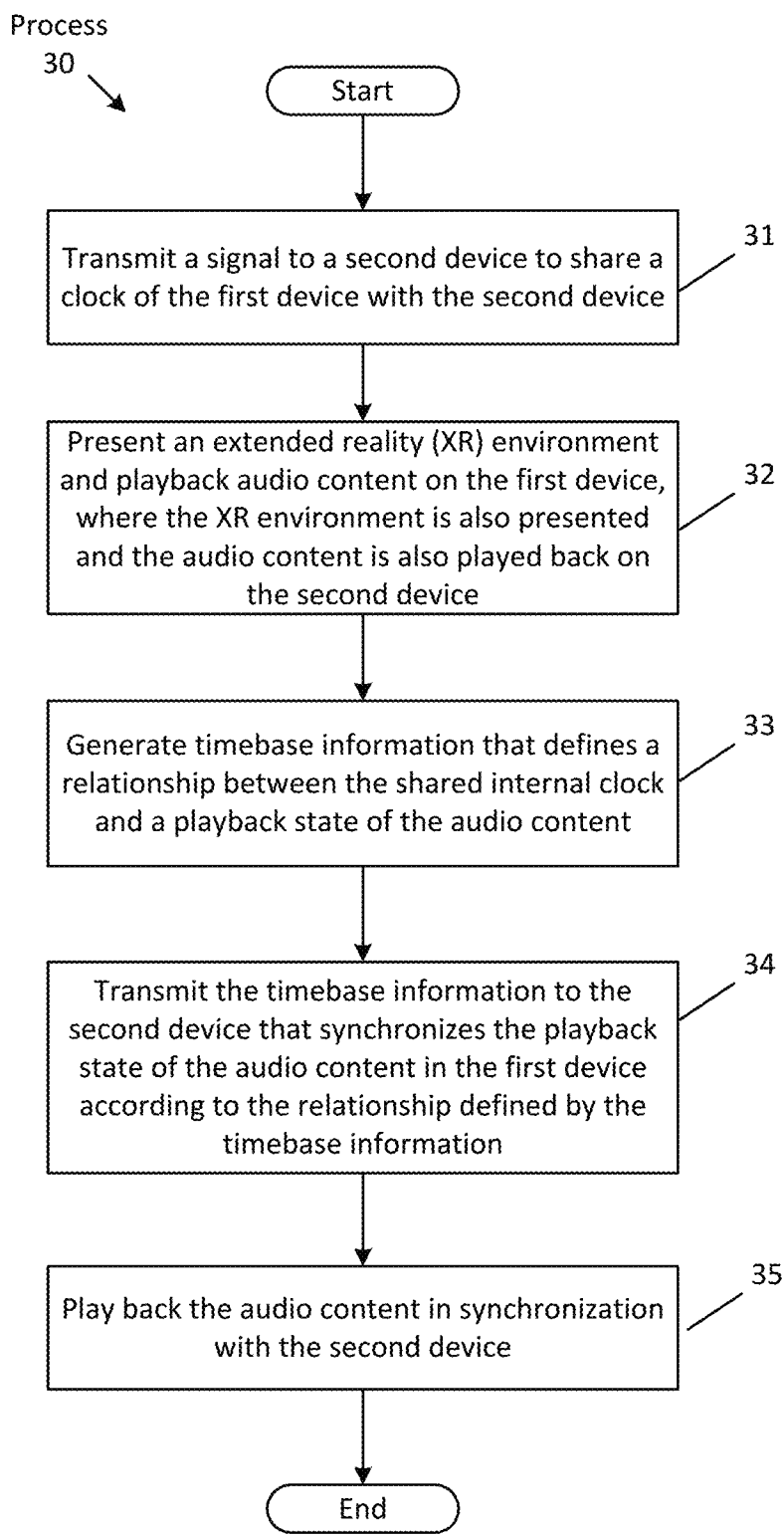
FIG. 4 is a flowchart of one aspect of a process to generate and transmit a timebase hierarchical tree (e.g., as timebase information) to the second electronic device in order to time-align audio playback between both devices according to one aspect.

FIG. 4 is a flowchart of a process 30 that may be performed by the controller 60 of the first device 1 (and/or one or more controllers or processors of the second device 2) of the audio system 10, described herein. For instances, at least some of the operations of process 30 may be performed by the controller 60 of the first device 1 and/or at least some of the operations may be performed by a controller of the second device 2. In some aspects, at least some of the operations may be performed by (one or more processors of) another electronic device that is communicatively coupled with either device of the audio system, such as a remote server. Thus, this figure will be described with reference to FIGS. 1A-3.

FIG. 4 is a flowchart of one aspect of a process to generate and transmit a timebase hierarchical tree (e.g., as timebase information or timing data) to the second device in order to time-align audio playback between both devices according to one aspect. The process 30 begins by the controller 60 transmitting a signal to a second (electronic) device (e.g., device 2 of FIGS. 1A and 1B) to share a clock of the first device with the second device (at block 31). Specifically, the controller may define (or determine) a clock to be shared between both devices, and may transmit (via the network interface 61) clock data associated with the clock to second device in order to define a corresponding clock at the second device, such that both clocks are aligned with one another. For example, the device may retrieve clock data from an external source (e.g., based on an atomic time provided by a GPS satellite network), with which to define the clock. In some aspects, the controller may define the clock according to timing messages received from other devices. For example, the controller may set the clock based on time information contained within timing messages that is received from a Network Time Protocol (NTP) server. In another aspect, the defined clock may be separate from an internal clock of the first device (e.g., a clock based on an electronic oscillator circuit integrated therein) that the first device uses to perform timely audio signal processing operations (e.g., where the first device uses the clock for playback of audio and/or video of the XR presentation). In some aspects, the internal clock of the first device may be set (or defined) based on the shared clock. In another aspect, the time information used to define the shared clock may be based on the internal clock of the first device. In another aspect, the clock of the first device may be defined by the controller by any known method.

In one aspect, the clock shared between both devices may be defined based on a proximity of the second device from the first device. Specifically, the controller may be configured to determine whether the second device is located within a threshold distance (e.g., one foot) of the first device. For instance, the controller may obtain location data (e.g., GPS data) from the second device and obtain location data associated with the first device, and determine a distance based on a comparison of both device's location data. In another aspect, the controller may determine distance from the second device by measuring round trip times of one or more data packets that are exchanged between both devices. In another aspect, the controller may make this determination based on sensor data from one or more sensors that are communicatively coupled with the controller (and/or coupled to the first device). For instance, the controller may receive image data from the camera 62, and may be configured to perform an image recognition algorithm upon the image data to detect another device. Once another device is detected, the controller determines the location of the device (with respect to the first device) based on the image data. For instance, the controller may determine the position and/or orientation of the first device (e.g., from an inertial measurement unit (IMU) integrated therein), and may determine the location of the other device with respect to the position of the first device by analyzing the image data (e.g., pixel height and width).

In one aspect, in response to the second device being located within the threshold distance, the controller may transmit clock synchronization messages using IEEE 802.1AS protocol in order to synchronize a clock of the second device with the clock of the first device. If, however, the second device is located outside the threshold distance, the second device's clock may be defined based on timing information from the NTP server. In particular, the controller may signal the second device to set a clock using the time information received by the second device from the NTP server. In one aspect, both devices may set their clocks based on the time information from the NTP server in response to the second device being located outside the threshold distance. Thus, both devices share clocks that are set based on separately received time information from one or more NTP servers.

The process 30 continues by the controller 60 presenting a XR environment (such as environment 11) and playing back audio content on the first device, where the XR environment is also presented and the audio content is also played back on the second device (at block 32). Specifically, the controller presents the XR environment in which the first user 8 and the second user 9 of the second device are participants by rendering graphical data, as described herein. As described herein, along with graphically rendering the XR environment, the controller may render and playback one or more pieces of audio content. For instance, the audio content may be associated with the XR environment (e.g., ambient virtual sounds). In another aspect, the audio content may be associated with user input. For example, the controller may receive user input via a user-input device (e.g., controller) to interact with a virtual object within the XR environment (e.g., the drums 14 in FIG. 1B). In this case, the audio content is to be played back by both devices in response to the user-interaction with the virtual object.

The controller 60 generates a timebase hierarchical tree (e.g., as timebase information or timing data) that defines a relationship between the shared clock and a playback state of the audio content (at block 33). Specifically, the controller generates (or produces) a timebase hierarchical tree that includes a first timebase that defines a relationship between the shared clock and the internal clock of the first device and a second timebase that defines a relationship between the first timebase and a playback state of the audio content. Thus, the first timebase represents the internal clock of the first device, where both the first timebase and the internal clock are rooted (e.g., synchronized according) to the shared clock. In one aspect, the playback state may indicate an initial playback of the audio content and the relationship indicates that the audio content is to be played back at a playback time after a current time of the shared clock at a playback rate. For example, the timebase may indicate the rate (R) as being the normal speed, and the playback time may be an offset (e.g., three seconds), as described herein. In another aspect, the playback state may indicate other states of the audio content, such as a stop state and a pause state. In some aspects, the timebase information may include identification information of which audio content is defined as having the relationship. In some aspects, the timebase tree may be generated as a data structure that includes the timebase information (and/or the identification information).

As described herein, the generated timebase hierarchical tree may include two timebases. In one aspect, the generated tree may include more or less timebases. For instance, the generated tree may include one or more timebases that each represent a relationship between one or more (internal) clocks of the device and one or more other clocks and/or one or more playback states of pieces of audio content.

The controller 60 transmits the generated timebase information to the second device that synchronizes the playback state of the audio content in the second device according to the relationships defined by the tree (at block 34). Specifically, the controller may serialize the timebase information (e.g., data structure) into another data format (e.g., eXtensible markup Language (XML) format, etc.). The serialized information is transmitted to the second device (e.g., via the communication link 7), which is configured to reconstruct the timebase information, as described herein. As a result, both devices include the same timebase information, where the timebase information share a same internal (or two synchronized internal) clocks.

The controller plays back the audio content in synchronization with the second device (at block 35). Specifically, since both devices include the same timebase hierarchical trees (e.g., timebase information), the devices become configured to synchronize playback of the audio content. For instance, both devices may render the audio content according to the timebase associated with the audio content. For instance, the controller may receive (or retrieve) an audio signal that contains the audio content (e.g., from local memory or from a remote memory storage, such as a remote server). The controller may render the audio signal according to the timebase to produce at least one driver signal, and drive the left speaker 4 and/or the right speaker 5 with the at least one driver signal (e.g., using a driver signal to drive speaker 4 and using another driver signal to drive speaker 5). In one aspect, the controller may transmit (e.g., using the network interface 61) the driver signal(s) to the headset 15 to drive the left and/or right speakers. In one aspect, a controller of the second device may perform at least some of the same operations in order to render the audio content. As a result, both devices produce driver signals that have a same playback rate and are to playback at a same playback time as indicated by the timebase. In one aspect, both devices may drive their respective speakers (either integrated therein or a part of another audio output device, such as the headset 15 shown in FIGS. 1A and 1B) using the driver signals at the playback time according to the shared clock (or according to another timebase).

In one aspect, the controller 60 of the first device 1 may perform one or more additional audio signal processing operations upon (e.g., the audio signal of) the audio content. For instance, the audio signal may be spatially rendered by applying one or more spatial filters (e.g., Head-Related Transfer Functions (HRTFs)) in order to spatialize the audio. As another example, the audio signal may be spectrally shaped by applying one or more audio processing (e.g., linear) filters (e.g., a low-pass filter, a band-pass filter, etc.).

Figure 5:
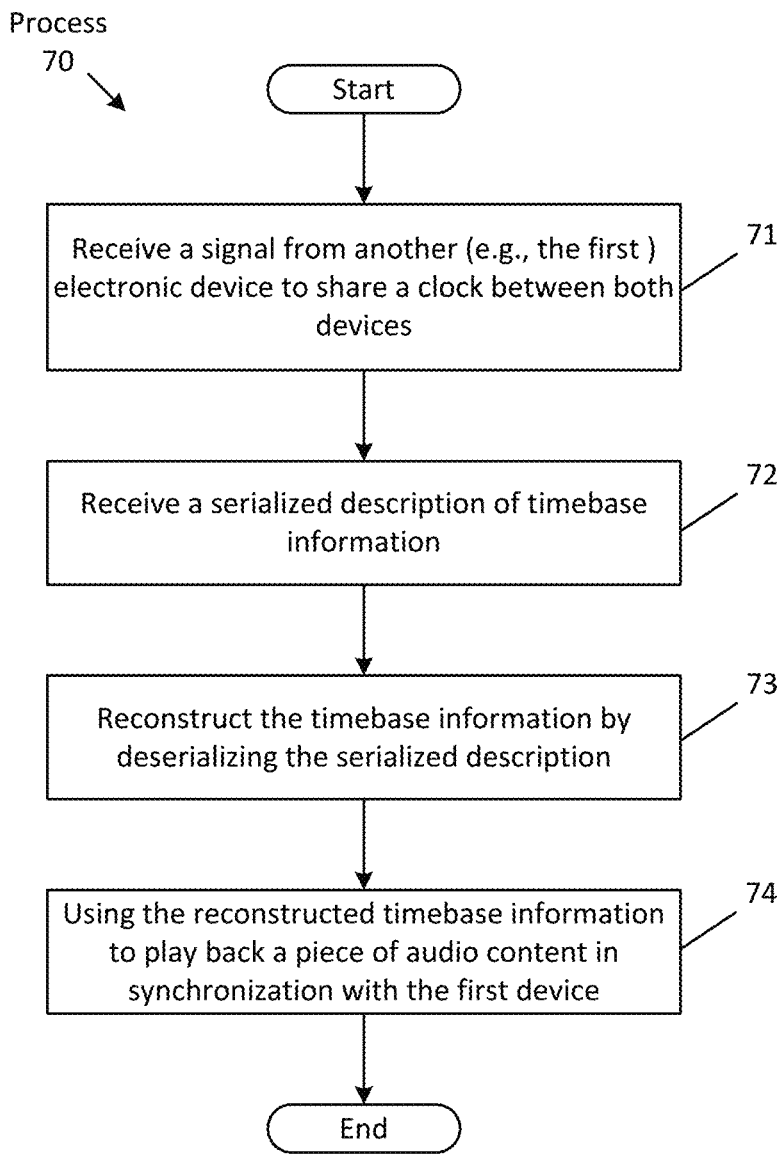
FIG. 5 is a flowchart of one aspect of a process to reconstruct and use received timebase information to synchronize audio playback with one or more other devices, according to one aspect.

FIG. 5 is a flowchart of one aspect of a process 70 to reconstruct and use a received timebase information to synchronize audio playback with one or more other devices, according to one aspect. Specifically, this process will be described with reference to the second device 2 with which the first device 1 wishes to synchronize playback, as described in FIG. 4. In particular, one or more controllers of the second device may perform one or more of the operations of this process. In another aspect, at least some of these operations may be performed by the (e.g., controller 60 of the) first device 1, which performed the operations of process 30. In which case, another device may have transmitted a timebase tree to the first device 1 for synchronized playback.

The process begins by (e.g., a controller of) the second device receiving a signal from another (e.g., the first) device to share a clock between both devices (at block 71). In one aspect, this signal may be the same signal that was transmitted by the first device 1 at operational block 31 of process 30 in FIG. 4. The second device receives a serialized description of timebase information (e.g., a hierarchical tree) generated by the first device with respect to the shared clock, as described herein (at block 72). The second device reconstructs the timebase information by deserializing the serialized description (at block 73). Specifically, the second device reconstructs the hierarchical tree defined by the timebase information, where the tree may include one or more timebases, where each timebase defines a relationship between a clock and/or another timebase. For example, the tree may include a first timebase that defines a relationship between the shared clock between the devices and an internal clock of the first device. Thus, the first timebase (e.g., which is synchronized with the internal clock of the first device, since both the internal clock of the first device and the first timebase operate with respect to (or are rooted in) the shared clock). The tree may also include a second timebase that defines a relationship between the first timebase and a playback state of a piece of audio content that is to be played back between both devices. The second device uses the reconstructed timebase information to playback the piece of audio content in synchronization with the first device (at block 74).

Some aspects perform variations of the processes 30 and 70 described in FIGS. 4 and 5, respectively. For example, the specific operations of at least some of the processes may not be performed in the exact order shown and described. The specific operations may not be performed in one continuous series of operations and different specific operations may be performed in different aspects. For instance, the controller may signal the second device to share a clock once it is determined that both devices are to playback a piece of audio content. In another aspect, both devices may already be sharing a clock (e.g., the first device may have previously transmitted timing data), as describe herein. In that case, the operations of block 31 may be omitted in future performances of this process. In another aspect, the presentation of the XR environment at block 32 may be performed before or contemporaneously with the playback of the audio content at block 35. For instance, the controller may determine that the first user wishes to participate in the XR environment, as illustrated in FIG. 1B. In some aspects, along with transmitting the timing data to the second device, the controller may transmit the same (or similar) data to one or more other devices, such that each device plays back time-aligned audio content.

In addition, although only described as generating the timing data with reference to playback of one audio content, the process 30 may be performed for generating the timing data for playback of one or more pieces of audio content. For instance, the timing data may include a timebase hierarchical tree with several timebases, each describing playback of one or more pieces of audio content.

In one aspect, a timebase hierarchical tree (timing data) may be updated and retransmitted to the second device to replace its (and the first device's) existing tree(s). For example, once the tree is transmitted, the user of the first device may change the playback state of the audio content. As an example, the user may want to slow the playback rate (e.g., from 1.0 to 0.5) of (audio content associated with) one or more timebases, or may want playback to begin a period of time after playback of another piece of audio content. In response, the controller 60 may generate adjusted tree and transmit the adjusted tree to the second device. Specifically, to generate the adjusted tree the controller may generate a new tree by using the existing timing data of the previously generated tree that is being shared between the devices, along with (or in addition to) any adjustments made by the user. In other words, the new tree may include adjusted relationships between one or more (e.g., preexisting and/or new) timebases based on the change (or update) to the original tree.

In one aspect, the adjustment to the existing tree may be an addition of one or more timebases (e.g., based on the user wanting another piece of audio content to be played). For example, the controller may determine that another (second) audio content associated with the XR environment is to be played back by both devices (e.g., a sound of a virtual guitar being played). The controller may add a new timebase for playback of the second audio content into the timebase hierarchical tree, and may define a relationship for that timebase to an existing timebase. In one aspect, the relationship may be between another timebase within the tree, such as the timebase associated with the drum sound described above.

In one aspect, such a relationship may be made such that any (e.g., future) adjustments to a timebase, may also affect playback of other content. For example, adjusting a rate of a timebase may adjust playback of one or more children timebases of that parent timebase. As a result, audio content associated with the children timebases may be played back differently (e.g., the playback timing may be adjusted) according to the adjusted rate. In one aspect, adjustments to timebases may also affect (or be applied) to one or more children of that timebase. In another aspect, adjusting a timebase may not affect (e.g., playback of audio content associated with) one or more children of that adjusted timebase. Thus, the controller may dynamically perform timing adjustments that affect several timebases, by only adjusting a parent timebase. Thus, the first device may generate new timing data that includes data of the original (or previous) timing data and defines another relationship between the relationship of the previous timebase and a second playback state of the second audio content. For instance, this new timebase may branch from one of the four timebases 21-24 illustrated in FIG. 3.

In another aspect, the controller 60 may receive similar timing data from the second device. For example, both devices may generate separate timing data, each associated with a different timebase tree. Each device may use both trees to synchronize audio playback. In one aspect, both trees may share the same or different clock. In another aspect, both devices may be configured to adjust shared timing data. In this case, rather than generate the timing data at block 33, the first device may adjust the timing data (e.g., by adding a timebase to the timebase tree), and transmit the adjusted timing data to the second device. In some aspects, the second device may perform similar operations.

Figure 6:
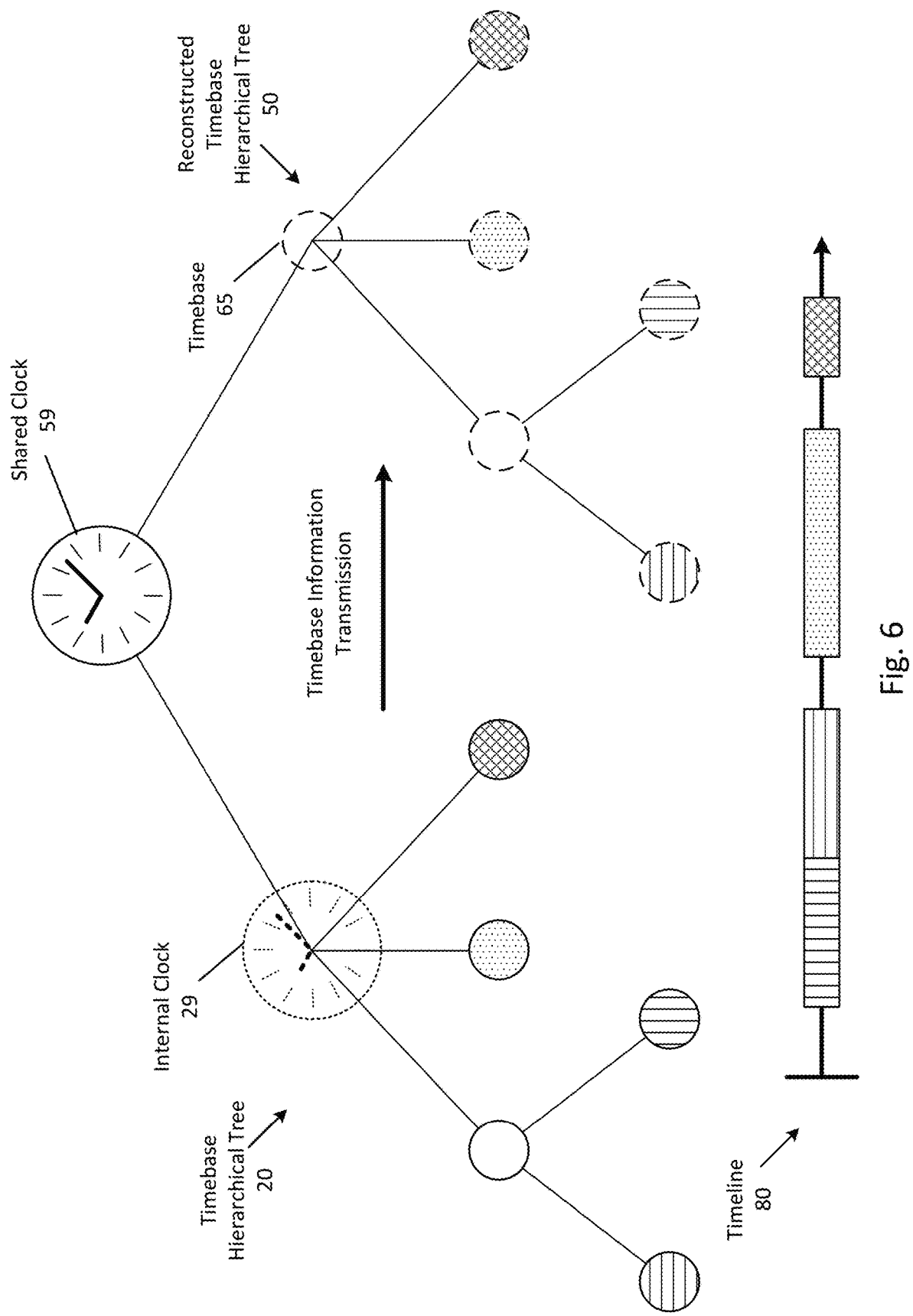
FIG. 6 shows the timebase hierarchical trees of both the first and second devices that share a common clock according to one aspect.

FIG. 6 shows timebase hierarchical trees of both the first and second devices that share a common clock according to one aspect. Specifically, this figure illustrates the timebase information transmission from the first device to the second device (e.g., as described in FIGS. 4 and 5). In particular, this shows the timebase hierarchical tree 20 of the first device 1 having been transmitted (e.g., serialized and transmitted over a computer network) to the second device 2, and the second device having reconstructed the hierarchical tree 20 as hierarchical tree 50.

As shown, the first node (or root) of each of the hierarchical trees is a common clock 59 that is shared between both devices. As a result of both devices' trees sharing the same root clock, both devices will playback time-aligned audio content, as described herein. Specifically, both devices are sharing a same timeline 80, which is similar to timeline 26, except that timeline 80 (e.g., the black line with the arrow) represents the time of the clock 59 that is shared between both devices. This allows both devices to have time-aligned audio playback, as described herein.

This figure also shows that the internal clock 29 of the first device 1 is being represented by a timebase 65 in the reconstructed tree 50. As described herein, this timebase may define a relationship between the shared clock 59 and the internal clock 29. As a result, this timebase may act as a final (or main parent) timebase for other timebases that branch off this timebase. In another aspect, the internal clock 29 of the first device may be defined (or set) with timing data of the shared clock 59. As a result, the shared clock 59 may be in place of the timebase 65 of the reconstructed timebase hierarchical tree 50.

As described herein, the first device may transmit timebase information to the second device in order for both devices to have (share) the same timebase hierarchical tree. Specifically, the tree generated by the first device and the reconstructed tree by the second device may share similar (or same) relationships between clocks and/or timebases, but the trees may be (e.g., structured) differently. For instance, the tree 20 of the first device includes relationships between an internal clock 29 of the first device and several timebases. In order to synchronize audio playback between the devices, this internal clock is defined as timebase 65 in the reconstructed tree 50. As a result, the reconstructed tree includes timebase 65, which represents a relationship between the internal clock 29 of the first device and the shared clock 59. Thus, even though the reconstructed tree 50 includes an additional timebase 65 in lieu of the internal clock 29 of the first device, both trees may be considered the same in the sense that they provide the same relationships, as described herein.

As described thus far, the timebase hierarchical trees 20 and 50 are for performing time-aligned audio playback between two or more devices. In another aspect, timebase trees may be used to align animations or video (e.g., associated with the XR environment) between devices. Thus, the audio system 10 may define video playback of one or more video assets associated with the XR environment with respect to one or more trees. In some aspects, a tree may define both audio and video playback, as described herein.

In one aspect, at least some of the operations of described herein (e.g., in processes 30 and 70 of FIGS. 4 and 5, respectively), may be performed by a machine learning algorithm. In another aspect, the machine learning algorithm may include one or more neural networks (e.g., convolution neural networks, recurrent neural networks, etc.) that are configured to perform the operations described herein.

Personal information that is to be used should follow practices and privacy policies that are normally recognized as meeting (and/or exceeding) governmental and/or industry requirements to maintain privacy of users. For instance, any information should be managed so as to reduce risks of unauthorized or unintentional access or use, and the users should be informed clearly of the nature of any authorized use.

As previously explained, an aspect of the disclosure may be a non-transitory machine-readable medium (such as microelectronic memory) having stored thereon instructions, which program one or more data processing components (generically referred to here as a "processor") to perform one or more of the operations (e.g., the operations described in processes 30 and/or 70 of FIGS. 4 and 5) described herein. In other aspects, some of these operations might be performed by specific hardware components that contain hardwired logic. Those operations might alternatively be performed by any combination of programmed data processing components and fixed hardwired circuit components.

According to one aspect of the disclosure, a method performed by a first electronic device includes signaling a second electronic device to share a clock in the first electronic device with the second electronic device, presenting an XR environment in which first and second users of the first and second devices, respectively, are participants and in which audio content is to be played back by both devices, generating timing data that defines a relationship between the shared clock and a playback state of the audio content; and transmitting the timing data to the second device that synchronizes the playback state between both devices according to the relationship defined by the timing data.

According to another aspect of the disclosure, an article of manufacture comprises a non-transitory machine readable medium storing instructions which when executed by a processor of a first electronic device causes the device to transmit a signal a second electronic device to share a clock of the first electronic device with the second electronic device; present an extended reality (XR) environment in which a first user of the first electronic device and a second user of the second electronic device are participants and in which audio content is to be played back by the first and second electronic devices; generate timing data that defines a relationship between the shared clock and a playback state of the audio content; and transmit the timing data to the second electronic device that synchronizes the playback state of the audio content in the second electronic device, with the playback state of the audio content in the first electronic device according to the relationship defined by the timing data.

In one aspect, the instructions to determine whether the second electronic device is located within a threshold distance of the first electronic device, wherein, in response to the second electronic device being located within the threshold distance, the instructions to signal the second electronic device to share the clock comprises instructions to transmit clock synchronization messages using IEEE 802.1AS. In another aspect, the non-transitory machine readable medium has further instructions to set the clock in the first electronic device based on time information that is received from a Network Time Protocol (NTP) server. In some aspects, to set the clock based on the time information is in response to the second electronic device being located outside the threshold distance. In one aspect, the instructions to signal the second electronic device to share the clock comprises instructions to signal the second electronic device to set a clock in the second electronic device using time information received by the second electronic device from the NTP server.

In one aspect, the non-transitory machine readable medium has further instructions to receive user input via a user-input device to interact with a virtual object within the XR environment, wherein the audio content is to be played back in response to the interaction with the vertical object. In some aspects, the timing data is first timing data, the relationship is a first relationship, the audio content is a first audio content and the playback state is a first playback state, wherein the non-transitory machine readable medium has further instructions to determine that a second audio content associated with the XR environment is to be played back by the first and second electronic devices; and generate a second timing data that includes data of the first timing data and defines a second relationship between the first relationship and a second playback state of the second audio content.

In one aspect, the playback state is to initiate playback of the audio content and the relationship indicates that the audio content is to be played back at a playback time after a current time of the shared clock at a playback rate. In some aspects, the non-transitory machine readable medium has further instructions to render the audio content according to the playback rate to produce a driver signal; and drive a speaker that is coupled to the first electronic device using the driver signal at the playback time according to the shared clock. In some aspects, the instructions to present the XR environment comprises instructions to display, on a display screen, image data that represents a virtual scene within the XR environment.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method performed by a first electronic device that has an internal clock, the method comprising:
   sharing a clock in the first electronic device with a second electronic device by:
   determining whether the first electronic device is within a threshold distance from the second electronic device,
   responsive to the first electronic device being within the threshold distance, transmitting clock synchronization messages based on the clock in the first electronic device to the second electronic device, and
   responsive to the first electronic device not being within the threshold distance, transmitting a message to instruct the second electronic device to request time information from a remote server to set a clock of the second electronic device such that both electronic devices are configured to operate using their separate clocks that are synchronized with a clock of the remote server;
   generating timebase information that includes a first timebase that defines a first relationship between the shared clock and the internal clock of the first electronic device and a second timebase that defines a second relationship between the first timebase and a playback state of audio content;
   transmitting the timebase information to the second electronic device; and
   synchronously playing back the audio content on the first electronic device with playback of the audio content on the second electronic device according to the first and second relationships defined by the first and second timebases, respectively, of the timebase information.

2. The method of claim 1, wherein the clock synchronization messages are transmitted using IEEE 802.1AS protocol.

3. The method of claim 1, wherein the remote server is a Network Time Protocol (NTP) server.

4. The method of claim 3, wherein the clock in the first electronic device is set using time information received from the NTP server.

5. The method of claim 1 further comprising:
   displaying a virtual object of an extended reality (XR) environment on a first display of the first electronic device, wherein the virtual object of the XR environment is also displayed on a second display of the second electronic device; and
   receiving user input via a user-input device to interact with the virtual object within the XR environment, wherein the audio content is to be played back on both electronic devices in response to the interaction with the virtual object.

6. The method of claim 1, wherein the timebase information is a first timebase information, and wherein the audio content is a first audio content and the playback state is a first playback state, the method further comprises:
   determining that a second audio content is to be played back by the first and second electronic devices; and
   generating a second timebase information that includes the first and second timebases of the first timebase information and includes a third timebase that defines a third relationship between the second timebase and a second playback state of the second audio content.

7. The method of claim 1, wherein the playback state is to initiate playback of the audio content and the second timebase indicates that the audio content is to be played back at a playback time after a current time of the first timebase at a playback rate.

8. The method of claim 1, wherein determining whether the first electronic device is within the threshold distance from the second electronic device comprises:
   determining a first location of the first electronic device;
   receiving, from the second electronic device, a second location of the second electronic device; and
   determining a distance between both devices based on a comparison between the first and second locations.

9. The method of claim 1 further comprising:
   capturing, using a camera, one or more images that include the second electronic device;

determining a location of the second electronic device based on the one or more images; and determining a distance between both devices based on the location of the second electronic device.

10. The method of claim 1, wherein, when the first electronic device is not within the threshold distance, both electronic devices are in two different locations.

11. A first electronic device comprising:

at least one processor; and memory having instructions stored therein which when used to execute the at least one processor causes the first electronic device that has an internal clock to:

share a clock in the first electronic device with a second electronic device by:

determining a distance between the first electronic device and the second electronic device, responsive to the distance being less than or equal to a threshold distance, transmitting clock synchronization messages based on the clock of the first electronic device to the second electronic device, and responsive to the distance first being greater than the threshold distance, transmitting a message to instruct the second electronic device to request time information from a remote server to set a clock of the second electronic device such that both electronic devices are configured to operate using their separate clocks that are synchronized with a clock of the remote server;

playing back audio content on the first electronic device, while the audio content is being played back on the second electronic device;

generate timebase information that includes a first timebase that defines a first relationship between the shared clock and the internal clock of the first electronic device and a second timebase that defines a second relationship between the first timebase and a playback state of the audio content; and transmit the timebase information to the second electronic device that synchronizes the playback state of the audio content in the second electronic device, with the playback state of the audio content in the first electronic device.

12. The first electronic device of claim 11, wherein the clock synchronization messages are transmitted using IEEE 802.1AS protocol.

13. The first electronic device of claim 11, wherein the remote server is a Network Time Protocol (NTP) server.

14. The first electronic device of claim 13, wherein the clock in the first electronic device is set using time information received from the NTP server.

15. The first electronic device of claim 11, wherein the memory has further instructions to:

present an extended reality (XR) environment on the first electronic device, while the XR environment is simultaneously presented on the second electronic device; and receive user input via a user-input device to interact with a virtual object within the XR environment, wherein the timebase information is generated and transmitted in response to the interaction with the virtual object.

16. The first electronic device of claim 15, wherein the playback state of the audio content is to playback a sound associated with the interaction with the virtual object, wherein the timebase information is transmitted such that the sound is synchronously played back by both devices.

17. The first electronic device of claim 11, wherein the playback state is to initiate playback of the audio content and the second timebase indicates that the audio content is to be played back at a playback time after a current time of the first timebase at a playback rate.

18. A method performed by a first electronic device, the method comprising:

receiving a signal from a second electronic device to share a clock in the first electronic device with a clock in the second electronic device;

receiving a serialized description of timebase information generated by the second electronic device with respect to the shared clock;

reconstructing the timebase information by deserializing the serialized description, wherein the reconstructed timebase information comprises at least a first timebase that defines a first relationship between the shared clock and an internal clock of the second electronic device and a second timebase that defines a second relationship between the first timebase and a playback state of a piece of audio content; and synchronously playing back the piece of audio content on the first electronic device with playback of the piece of audio content on the second electronic device using the first and second relationships defined by the first and second timebases, respectively, of the reconstructed timebase information, wherein in response to the first electronic device being within a threshold distance from the second electronic device, the signal comprises clock synchronization messages based on the clock in the second electronic device such that both electronic devices are configured to operate using separate clocks that are synchronized according to time information within the clock synchronization messages, and in response to the first electronic device not being within the threshold distance, the signal comprises a message to instruct the first electronic device to request time information from a remote server to set the clock in the first electronic device such that both electronic devices are configured to operate using their separate clocks that are synchronized with a clock of the remote server.

19. The method of claim 18 further comprising presenting an extended reality (XR) environment and playing back the piece of audio content on the first electronic device, wherein the XR environment is also presented and the piece of audio content is played back on the second electronic device, wherein the piece of audio content is associated with a virtual object contained within the XR environment.

20. The method of claim 18, wherein the playback state indicates that playback of the piece of audio content is to be initiated and the second timebase of the reconstructed timebase information indicates a playback time of the piece of audio content with respect to a current time of the first timebase at a particular playback rate.

* * * * *